US010728875B2

(12) United States Patent
Nayak et al.

(10) Patent No.: US 10,728,875 B2
(45) Date of Patent: Jul. 28, 2020

(54) SCANNING FREQUENCY SELECTION FOR A WIRELESS DEVICE

(71) Applicant: Google LLC, Mountain View, CA (US)

(72) Inventors: Shivank Nayak, San Jose, CA (US);
Rukun Mao, Santa Clara, CA (US);
Qin Zhang, Mountain View, CA (US);
Siddharth Ray, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/149,974

(22) Filed: Oct. 2, 2018

(65) Prior Publication Data

US 2020/0107291 A1    Apr. 2, 2020

(51) Int. Cl.
| H04W 64/00 | (2009.01) |
| H04W 36/32 | (2009.01) |
| H04L 29/06 | (2006.01) |
| H04W 4/029 | (2018.01) |
| G06F 16/487 | (2019.01) |

(52) U.S. Cl.
CPC ........ *H04W 64/006* (2013.01); *G06F 16/487* (2019.01); *H04L 69/08* (2013.01); *H04W 4/029* (2018.02); *H04W 36/32* (2013.01)

(58) Field of Classification Search
CPC .......................... H04W 48/16; H04W 52/0229
See application file for complete search history.

(56) References Cited

U.S. PATENT DOCUMENTS

| 8,706,131 B2 | 4/2014 | Winters |
| 8,737,961 B2 | 5/2014 | Ma et al. |
| 8,923,857 B2 * | 12/2014 | Kazmi ................ H04W 48/16 455/434 |
| 9,686,795 B1 | 6/2017 | Prock et al. |
| 2009/0156206 A1 | 6/2009 | Rathonyi et al. |
| 2010/0093349 A1 * | 4/2010 | Gandhi ................ H04W 48/18 455/435.2 |
| 2011/0014913 A1 * | 1/2011 | Yoon .................... H04W 48/20 455/435.3 |

(Continued)

FOREIGN PATENT DOCUMENTS

EP    1739991    1/2007

OTHER PUBLICATIONS

"International Search Report and Written Opinion", PCT Application No. PCT/US2019/050862, dated Nov. 4, 2019, 19 pages.

*Primary Examiner* — Melanie Jagannathan
(74) *Attorney, Agent, or Firm* — Colby Nipper PLLC

(57) ABSTRACT

Methods, systems, and devices for wirelessly scanning frequency bands based on device location and/or mobility are presented. The method can include (i) scanning, by a mobile device and according to a first wireless scanning protocol, frequencies within first frequency bands that correspond to a first geographic region and second frequency bands that correspond to a second geographic region; (ii) determining at least one of an estimated location or an estimated mobility characteristic of the mobile device; (iii) determining, based on at least one of the estimated location or the estimated mobility characteristic, to adjust a scheduled time for the mobile device to initiate scanning according to a second wireless scanning protocol; (iv) and initiating at the scheduled time, scanning according to the second wireless scanning protocol.

20 Claims, 4 Drawing Sheets

(56) References Cited

U.S. PATENT DOCUMENTS

2011/0096697 A1* 4/2011 Anantharaman ... H04L 12/6418
  370/254
2011/0207473 A1* 8/2011 Swaminathan ....... H04W 48/16
  455/456.1
2012/0225649 A1* 9/2012 Yerrabommanahalli ....................
  H04W 48/18
  455/434
2014/0066061 A1 3/2014 Lou et al.
2015/0341833 A1* 11/2015 Palanisamy ....... H04W 36/0083
  455/436
2016/0198292 A1 7/2016 Sponza et al.
2016/0337946 A1 11/2016 Kim et al.

* cited by examiner

| Scan Protocol A | |
|---|---|
| Timeslot | Bands to Scan |
| 1 | Current Region |
| 2 | Current Region |
| 3 | Neighboring Regions |
| 4 | Current Region |
| 5 | Current Region |
| 6 | Neighboring Regions |
| 7 | Current Region |
| 8 | Current Region |
| 9 | All Bands |

310

| Scan Protocol B | |
|---|---|
| Timeslot | Bands to Scan |
| 1 | Current Region |
| 2 | Neighboring Regions |
| 3 | Current Region |
| 4 | Neighboring Regions |
| 5 | Current Region |
| 6 | Neighboring Regions |
| 7 | Current Region |
| 8 | Neighboring Regions |
| 9 | All Bands |

330

| Scan Protocol C | |
|---|---|
| Timeslot | Bands to Scan |
| 1 | Neighboring Regions |
| 2 | Neighboring Regions |
| 3 | Neighboring Regions |
| 4 | All Bands |

```
Scanning, by a mobile device and according to a first scanning protocol,
frequencies within one or more first frequency bands that correspond to a
first geographic region and frequencies within one or more second
frequency bands that correspond to a second geographic region
                                                                    402
```

↓

```
Determining an estimated mobility characteristic of the mobile device
                                                                    404
```

↓

```
Determining, based on the estimated mobility characteristic, whether to
adjust a scheduled time for the mobile device to initiate scanning according
to a second wireless scanning protocol
                                                                    406
```

↓

```
Initiating, by the mobile device and at the scheduled time, scanning
according to the second wireless scanning protocol
                                                                    408
```

FIG. 4 ions). If an appropriate operating band has not been identified after a predetermined period of time, the device may transition to using another protocol that scans more often a larger number of frequency bands (e.g., a protocol that calls for scanning sets of bands for neighboring or other regions as often, or more often, than scanning the set of bands for the particular region).

SCANNING FREQUENCY SELECTION FOR A WIRELESS DEVICE

TECHNICAL FIELD

This disclosure generally relates to wireless communication techniques, including techniques for conserving energy expended by a mobile communication device in scanning for wireless networks.

BACKGROUND

When a mobile communication device powers-on or enters a new service area, it may scan multiple frequency bands in order to identify an appropriate operating band for communication.

SUMMARY

Mobile communication devices, such a cellular phones or smart phones, are often configured to support operation in a large number of frequency bands. However, in a particular region (e.g., a geographic area, a country), mobile devices typically use only a fraction of the supported frequency bands. As a result, when the mobile device is first powered-on in a region, the device may have to scan multiple, sometimes many, frequency bands to identify an appropriate operating band in the region. In some cases, where communication network coverage is sparse or the set of operating bands for the region is not stored in the user equipment, the mobile device can spend significant time searching for a communication signal in an appropriate operating band. Because scanning frequency bands is a power-intensive operation that uses device's radio frequency (RF) front-end electronics, significant power savings can be achieved by implementing scan protocols that limit the bands scanned by the device to those bands most likely to be operable in the region.

In some implementations, a mobile communication device selects between two or more scan protocols based at least on an estimated location and/or an estimated mobility characteristic for the device. Each scan protocol can indicate one or more sets of frequency bands to scan, as well as how often each set of bands is scanned. For example, if the device is estimated to be in the interior of a particular geographic region, the device may use a scan protocol that calls for primarily scanning a set of frequency bands allotted for communications in that region, while only occasionally scanning a set of frequency bands allotted for communications in neighboring regions. Alternatively, if the device is estimated to be near the border of the particular region, the device may use a different scan protocol that calls for scanning the set of bands for neighboring regions as often as, or more often than, the set of bands for the particular region. As another example, if the device is estimated to have been stationary for a recent period of time, the device may continue to use a current scan protocol, while if the device is estimated to have been highly mobile for a recent period of time, the device may transition to using a different scan protocol (e.g., by initiating scanning according to the different scan protocol).

In some implementations, the device may initially search for an operating band using a scan protocol that scans primarily a limited number of frequency bands in a particular geographic region (e.g., a protocol that calls for primarily scanning the set of bands for a particular region while only occasionally scanning sets of frequency bands for other regions). If an appropriate operating band has not been identified after a predetermined period of time, the device may transition to using another protocol that scans more often a larger number of frequency bands (e.g., a protocol that calls for scanning sets of bands for neighboring or other regions as often, or more often, than scanning the set of bands for the particular region).

In some implementations, the device can determine whether to transition from using one scan protocol to another scan protocol based on an estimated mobility characteristic for the device. For example, when powered-on, based on an initial location estimate that indicates a likelihood that the device is in a particular geographic region, the mobile device may search for a communication signal according to a first scan protocol, scanning primarily those frequency bands associated with the particular region and only occasionally scanning bands of neighboring regions. If the initial location estimate was incorrect (e.g., due to low confidence in the estimate), if the set of operating bands in the region is not known, or if the device is estimated to have traveled a significant distance while searching for a signal, the device may not identify an appropriate operating band within the frequencies scanned. After a predetermined time, the device may initiate scanning according to a second scan protocol, which searches more often those bands associated with neighboring regions or other bands supported by the device.

The device may determine when to transition from using the first scanning protocol to the using second scanning protocol based, at least in part, on an estimated mobility characteristic of the device. For example, if, based on sensor or other data, the device determines that the device has likely been stationary (none or insignificant movement) over a recent period of time, it may transition to using the second scanning protocol after a particular predetermined duration. However, if the device determines that it has likely been moving at high speed (e.g., the device is in a train or other vehicle) over a recent period of time, it may be more likely that the device is now closer to a border region, and so the device may transition to using the second scanning protocol after a shorter duration.

The estimated mobility characteristic of the device can be generated by the device based on any of various available location predictions, such as a last known location of the mobile device, an amount of time that has elapsed since the last known location of the device, context data (e.g., data from a user account or sensor of the device, data stored on the device, data received by the device), inertial measurement unit (IMU) data (e.g., from one or more gyroscopes, magnetometers, and/or accelerometers), and/or image data (e.g., analysis of images captured by a camera on the device that correlate features shown in the images to known locations having those features).

The scan protocols used by the device may identify multiple sets of bands to scan. For example, a scan protocol can indicate that the device should scan a set of bands for a particular region as well as a set of bands for a neighboring region. In some examples, the scan protocol can indicate a relative frequency for scanning different sets of bands. For instance, the protocol can indicate that the device should scan the set of bands for the particular region three times as often as it scans the set of bands for a neighboring region.

In some implementations, the device can transition from using one scan protocol to another scan protocol, where both protocols indicate that a same set of bands should be scanned, but with different relative frequency. For example, the device may use a first protocol that indicates that the bands for the particular region should be scanned three times as often as the bands for the neighboring region. The device may then transition to using a second protocol that indicates that the bands for the particular region should be scanned only twice as often as the bands for the neighboring region. In some implementations, the device may be configured to scan using the first protocol and transition to scan using the second protocol if an appropriate operating band is not identified within a predetermined time period.

The predetermined time period at which the device transitions from using the first scan protocol to the second scan protocol can depend on the estimated location of the device and/or the estimated mobility characteristic of the device. For example, while the estimated location of the device is determined to be near the interior of the region or the device is estimated to have been stationary during a recent time period, the predetermined time period may be relatively long (i.e., the device continues to search using the first scan protocol for a relatively long time before transitioning to using the second scan protocol). However, if, after some time, the device is estimated to be located near a border of the region or the device is estimated to have been highly mobile during a recent time period, the predetermined time period for transitioning between scan protocols may be shorter (i.e., the device transitions from the first scan protocol to the second scan protocol after a shorter time period).

Using different scan protocols will, in general, result in differing levels of power consumption for the device, e.g., using a protocol that scans a larger set of bands less often will require less power than using a protocol that scans the larger set of bands more often. However, scanning larger sets of bands more often provides greater search coverage, decreasing the likelihood that the device will fail to find an operable band. As a result, the device can select a scan protocol to achieve a desired trade-off between power consumption and search coverage.

Some implementations of the subject matter disclosed herein include methods for wireless scanning. The methods can be performed in whole or in part by a mobile wireless communication device. The mobile device scans, according to a first wireless scanning protocol, frequencies within: (i) one or more first frequency bands that correspond to a first geographic region, and (ii) one or more second frequency bands that correspond to a second geographic region. The first wireless scanning protocol can specify relative amounts of time for scanning frequencies within the one or more first frequency bands and the one or more second frequency bands. A mobility characteristic of the mobile device can be determined. Based on the estimated mobility characteristic of the mobile device, the methods schedule a transition from scanning according to the first wireless scanning protocol to scanning according to a second wireless scanning protocol. The mobile device initiates, based on the scheduled transition, scanning according to the second wireless scanning protocol.

These and other implementations can optionally include one or more of the following features.

Scheduling the transition from scanning according to the first wireless scanning protocol to scanning according to the second wireless scanning protocol can be carried out in various ways. The transition may not occur immediately, but rather may be scheduled to occur at a future time when one or more transition criteria are met. Scheduling the transition can include initially setting or adjusting the transition criteria. In some cases, the transition criteria is time/temporal-based. For example, the mobile device may set a timer defining a length of time before mobile device transitions scanning to another wireless scanning protocol. When the timer expires, the mobile device transitions to scanning according to the second wireless scanning protocol. In other example, the mobile device may schedule the transition by setting a particular time for the transition. The mobile device may periodically check a clock signal, and when the clock indicates the current time matches the set transition time, the device may transition to scanning according to the second wireless scanning protocol. In some cases, the transition criteria may be count-based. For example, the device may count a number of times that one or more pre-defined events occur and may transition to the second wireless scanning protocol when the events are determined to occur a threshold number of times. Scheduling the transition can then involve setting the threshold number of events. In some cases, the transition criteria may be power-based. For example, the mobile device may set a battery charge level at which the transition should occur and/or may set a timer, time, or counter based on a current or predicted battery charge level of the device. When the battery charge level is higher, the device may schedule an earlier transition to the second wireless scanning protocol in some implementations to permit more frequent scanning of frequency bands outside the device's current region.

The mobility characteristic of the mobile device can reflect current or recent movements of the device, and can be based on accelerations of the device, velocities of the device, directions of movement of the device, or a combination of these and/or other motion information. The mobility characteristic can be estimated based on sensor information (e.g., using an accelerometer, magnetometer, or gyroscope). In some cases, mobility can be predicted based on historical mobility patterns of the mobile device, past locations of the mobile device, transportation logic (e.g., velocities of plane, car, train, feet, scooter, wheelchair, or other modalities), and probability assessments. The device may also account for the amount of elapsed time between the device being powered off and on. The mobility characteristic can be distinguished from location estimates that indicate locational rather than mobility information for the device. In some implementations, the scheduled transition can be determined based only on the estimated mobility characteristic without information about the device's current location (e.g., without a current location estimate).

The first geographic region can be identified based on the first geographic region encompassing an initial estimated location of the mobile device. Wireless communication systems in the first geographic region can broadcast wireless signals within the one or more first frequency bands. The second geographic region can be identified based on the second geographic region neighboring the first geographic region. Wireless communication systems in the second geographic region can broadcast wireless signals within the one or more second frequency bands.

The wireless communication systems in the first geographic region and the second geographic region can be cellular systems providing at least one of voice services or data services.

The one or more first frequency bands that correspond to the first geographic region can be different frequency bands than the one or more second frequency bands that correspond to the second geographic region.

The first geographic region can be a first country and the second geographic region can be a second country.

Identifying the first geographic region based on the first geographic region encompassing the initial estimated location of the mobile device can include: determining the initial estimated location of the mobile device; accessing a database that stores data correlating geographic regions with locations; and using the database to determine that the first geographic region is correlated with the initial estimated location.

The first wireless scanning protocol and the second wireless scanning protocol can each define a respective scanning cycle that includes multiple timeslots. The first wireless scanning protocol and the second wireless scanning protocol can each specify, for each timeslot in its respective scanning cycle, one or more frequency bands in which the mobile device should scan for frequencies during the timeslot.

The first wireless scanning protocol and the second wireless scanning protocol can each specify (i) a first subset of timeslots in the scanning cycle for scanning frequencies within the one or more first frequency bands corresponding to the first geographic region, (ii) a second subset of timeslots in the scanning cycle for scanning frequencies within the one or more second frequency bands corresponding to the second geographic region, and (iii) a third subset of timeslots in the scanning cycle for scanning frequencies within one or more other frequency bands.

A ratio of the first subset of timeslots for scanning frequencies within the one or more first frequency bands relative to the second subset of timeslots for scanning frequencies within the one or more second frequency bands can be less in the second wireless scanning protocol than in the first wireless scanning protocol.

Determining the estimated mobility characteristic of the mobile device can including monitoring, by the mobile device, movements of the mobile device based on data generated by an internal sensor of the device. The mobile device can determine whether to adjust the scheduled time for the mobile device to initiate scanning according to the second wireless scanning protocol based on the estimated mobility characteristic of the mobile device.

An estimated location of the mobile device can be determined, including by predicting the location of the mobile device based on user context data stored in a memory of the mobile device. The mobile device can schedule the transition from scanning according to the first wireless scanning protocol to scanning according to the second wireless scanning protocol further based on the estimated location of the mobile device.

Scheduling the transition from scanning according to the first wireless scanning protocol to scanning according to the second wireless scanning protocol can include adjusting, based on the estimated mobility characteristic, an initially scheduled transition to generate an adjusted transition schedule.

Adjusting the initially scheduled transition to generate the adjusted transition schedule can include delaying the initially scheduled transition based on determining that the mobile device is more likely located in the first geographic region than in the second geographic region.

Adjusting the initially scheduled transition to generate the adjusted transition schedule can include moving forward the initially scheduled transition based on determining that the mobile device is more likely located in the second geographic region than in the first geographic region.

Scheduling the transition from scanning according to the first wireless scanning protocol to scanning according to the second wireless scanning protocol can include generating, by the mobile device and based on the estimated mobility characteristic of the mobile device, a normalized elapsed time, and determining, by the mobile device, that the normalized elapsed time satisfies a transition criterion for transitioning to a different wireless scanning protocol.

The mobile device can identify a broadcasted network access signal within a scanned frequency band. In response to identifying the broadcasted network access signal within the scanned frequency band, the mobile device can cease to scanning the frequency bands.

Some implementations of the subject matter disclosed herein include one or more non-transitory computer-readable media having instructions stored thereon that, when executed by one or more processors, cause performance of operations for any of the disclosed methods/processes. Some implementations include a mobile device having the one or more processors and the computer-readable media with instructions encoded thereon as described.

Certain implementations can, in certain instances, can realize one or more of the following features and advantages. Frequency scanning accounts for a significant fraction of the overall device power consumption when the mobile device is searching for an operating frequency band. Because the power consumed by the device when scanning scales approximately proportionally with the number of bands scanned, by scanning most often a limited set of bands most likely to be operable in a particular region while only occasionally scanning one or more larger sets of bands, device power consumption during search operations can be considerably reduced without significant loss in search coverage.

For example, a device may identify a set of five bands for the particular geographic region associated with its estimated location (e.g., "local bands"), a set of eight bands associated with neighboring regions (e.g., "neighboring bands"), and a larger set of thirty or more bands necessary to search all potential operable frequencies (e.g., "all bands"). In many cases, scanning only the local bands enables the device to identify an appropriate operating frequency band with low power consumption (e.g., because only five frequency bands are searched). However, if the set of local bands does not include an operable band (e.g., if the estimated device location is incorrect, if the operating bands for the region are not well-known, or if a band has been newly-deployed in the region and the set has not yet been updated), scanning only the local bands can result in a failure to identify an operable band. Scanning the set of all bands will ensure that the device identifies an operable band if one is present, but requires significantly more power than scanning only the local bands (e.g., because thirty, rather than five, bands are searched).

To mitigate the risk that the device will miss scanning an operable band while still reducing power consumed during search, the device can implement one or more scan protocols that, while primarily scanning the set of local bands, also occasionally scan the set of neighboring bands and the set of all bands. By scanning most often the set of local bands and scanning less often the set of neighboring bands and the set of all bands, considerable power savings can be achieved with minimal loss in search coverage. For example, in some devices, by scanning a set of five local bands, a set of eight neighboring bands, and a set of thirty bands associated with all operable frequencies with a 6:2:1 ratio, respectively (i.e., scanning the set of local bands three times as often as scanning the set of neighboring bands, and six times as often as scanning the set of all bands), power savings of 59% or greater can be achieved compared to continuously scanning the set of thirty bands.

In some implementations, the relative frequency with which the device scans the different sets of bands (e.g., the local bands, the neighboring bands, and the set of all bands) can be varied to trade-off low power consumption (e.g., by scanning the local bands more often) and the ability to detect and acquire new bands (e.g., by scanning the more expansive sets of neighboring bands and/or all bands more often). By selecting a scanning protocol based at least in part on a current location estimate and/or an estimated mobility characteristic of the device, the device can manage power consumption by selecting a protocol whose trade-off between power consumption and number of band scans best suits the current device location and mobility.

The details of one or more implementations are set forth in the accompanying drawings and the description below. Other potential features and advantages of the disclosure will be apparent from the description, the drawings, and the claims.

BRIEF DESCRIPTION OF THE DRAWINGS

FIG. 3 is a diagram illustrating examples of scan protocols used for scanning frequency selection for a wireless device.

FIG. 4 is a flow chart illustrating an example of a method for scanning frequency selection for a wireless device.

Like reference numbers and designations in the various drawings indicate like elements.

DETAILED DESCRIPTION

Figure 1:
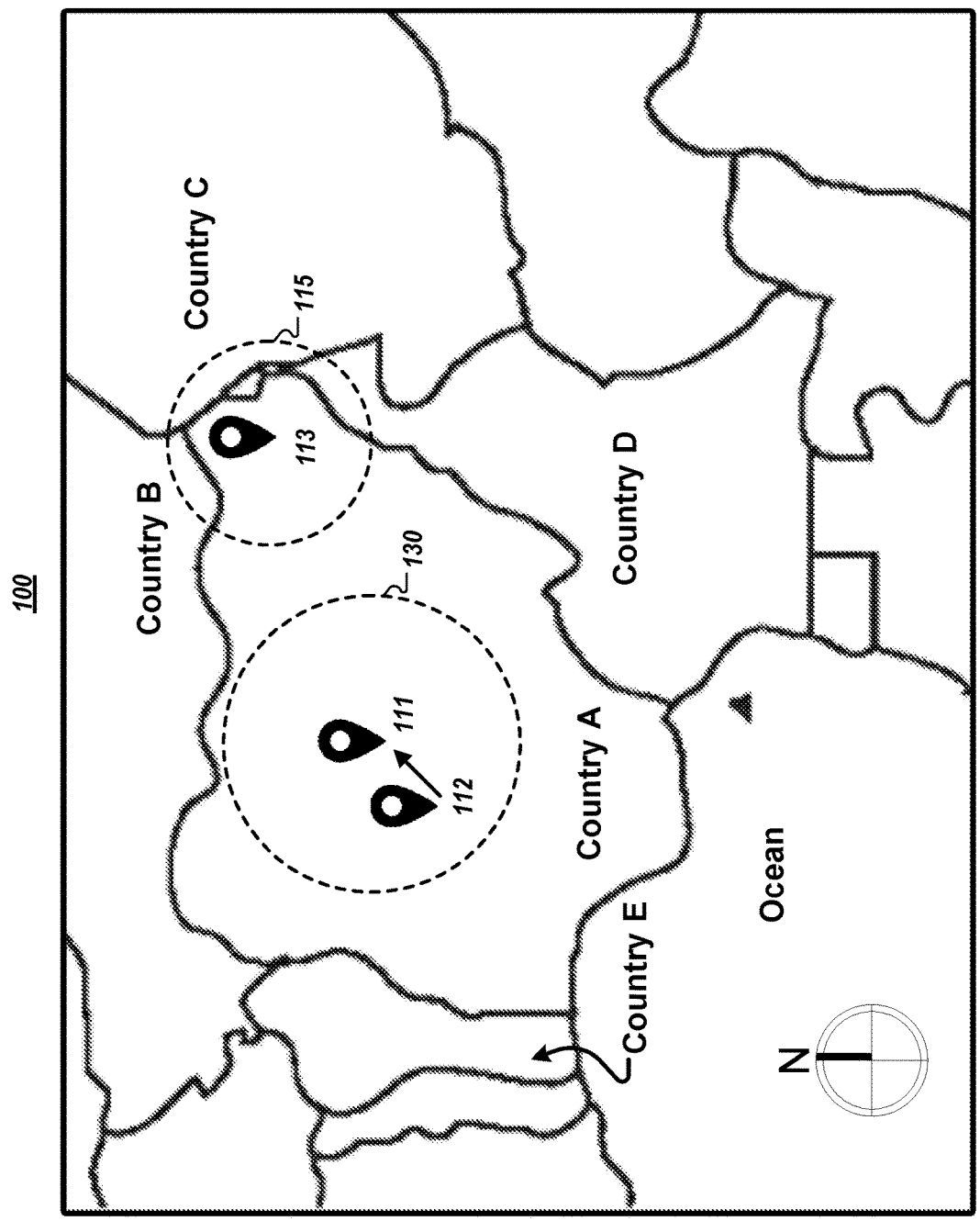
FIG. 1 is a diagram illustrating an example of scenario for scanning frequency selection for a wireless device.

FIG. 1 is a diagram illustrating an example scenario 100 for scanning frequency selection for a wireless device. In scenario 100, a mobile wireless communication device, such as a smart phone, was previously powered-off when it was at a known location 112, which is in a central region of Country A. The device makes an initial estimate of its location 111 when it powers back on, e.g., based on past known location, an estimated amount of time that has lapsed since the past known location 112 was determined, and may additionally reference other inputs such as the device's historical location patterns, time of day, and expected location based on user data (e.g., calendars, planned events, appointments). In some cases, the initial location estimate 111 is generated when measured location signals are unavailable (e.g., GPS or WiFi location signals). After an initial location estimate 111 has been determined, and a confidence level 130 attributed to the estimate, the device searches for an appropriate operating band by sequentially scanning a set of predetermined frequency bands.

In some implementations, the device can determine an initial location estimate and a confidence in the estimate. Because some time has elapsed since it last obtained a current location measurement (e.g., due to being powered off or otherwise losing location services for a period of time), uncertainty exists in its current location estimate 111 at the time it powered-on. The uncertainty is represented by the area encompassed by circle 130. As the confidence in the initial location estimate decreases, the size (e.g., radius) of the region of uncertainty 130 increases. Likewise, as the confidence in the initial location estimate increases, the size of the region of uncertainty 130 decreases.

When scanning bands for cell search, the device may reconfigure its hardware and software components for receiving communication signals within the particular band. When an appropriate communication signal is detected within a band, the device can designate that band as the operating band and cease scanning. The device can use the operating band to establish a connection with a communication network on one or more channels within the operating band, for example.

The mobile device can scan the set of predetermined frequency bands according to one or more scan protocols. In some implementations, a scan protocol defines a schedule for scanning a set of frequency bands. The schedule can specify an order and frequency with which different frequency bands are scanned. In the example scenario 100, after powering-on and estimating its initial location 111, the device is configured to scan frequency bands according to a first protocol that scans local frequency bands for Country A n times (e.g., 2, 3, 4, 5, 6, or more) as often as it scans neighboring bands for Countries B, C, D, and E. If the device has not identified an operating band after scanning for a pre-defined time interval (e.g., one hour) using the first protocol, it is configured to transition to (e.g., initiate scanning according to) a second scan protocol that scans local frequency bands for Country A only m (m<n) times as often as the neighboring bands for Countries B, C, D, and E.

In an example, while scanning frequency bands according to the first protocol, the device obtains sensor data (e.g., from an inertial measurement unit including accelerometer and/or gyroscope signals, and/or from a compass) indicating a mobility characteristic of the device, e.g., a current or recent speed and/or direction of movement of the device. Based on the sensor data, the device estimates that the device has likely moved back toward location 112, which is still in a central region of Country A. As a result, the device continues to scan according to the first scan protocol and remains configured to transition to the second scan protocol if it has not identified an operating band after scanning for one hour.

In another example, while scanning frequency bands according to the first protocol, the device receives sensor data indicating that the device is moving quickly (e.g., the device is in a vehicle and thus traveling above a threshold speed/velocity). Based on the sensor data, the device estimates that the device has moved to location 113, which is near the eastern border of Country A. As a result, the device continues to scan according to the first scan protocol, but adjusts the scheduled time at which it transitions from the first to the second scan protocol based on the new estimated location 113 of the device. In particular, the device advances or accelerates the planned transition time, such that the device transitions to scanning with the second scan protocol, which scans more often the neighboring bands for Countries B, C, D, and E, sooner than initially planned (e.g., after 30 minutes scanning with the first scan protocol rather than the originally planned 1 hour of scanning with the first scan protocol). By adjusting the transition time between the first and second scan protocols based on a current location estimate and/or mobility characteristic of the device, the device can manage the power consumed by frequency search operations while improving the probability of identifying an operable band.

In another example, the device can determine an initial scanning protocol to employ when it powers-on based on a confidence in its initial location estimate. For instance, the device may power-on and recognize that it was last known to be located in the northeast portion of Country A at location 113. However, because some time has elapsed since it last obtained a current location measurement (e.g., due to being powered off or otherwise losing location services for a period of time), uncertainty exists in its current location at the time it powered-on. The uncertainty is represented by the area encompassed by circle 115. In some implementations, the device can determine an initial location estimate and a confidence in the estimate. As the confidence in the initial location estimate decreases, the size of the region of uncertainty 115 increases. Likewise, as the confidence in the initial location estimate increases, the size of the region of uncertainty 115 decreases. In this example, the range of possible locations of the device as indicated by the region of uncertainty 115 crosses national borders, such that there is at least a threshold likelihood or probability of the actual location of the device when powered-on being in Country A, Country B, Country C, or Country D. The device can determine, based on the initial location estimate and confidence in the initial location estimate, relative probabilities or likelihoods that the device is located in each of Countries A, B, C, and D. The device can then set a scanning protocol consistent with the relative probabilities or likelihoods of the device being located in the various countries. For example, the device may set a scanning protocol that would involve scanning within frequency bands associated with Country A for a greater amount of time than it scans within frequency bands associated with Countries B, C, or D, reflecting the greater likelihood that the device is located in Country A.

Figure 2:
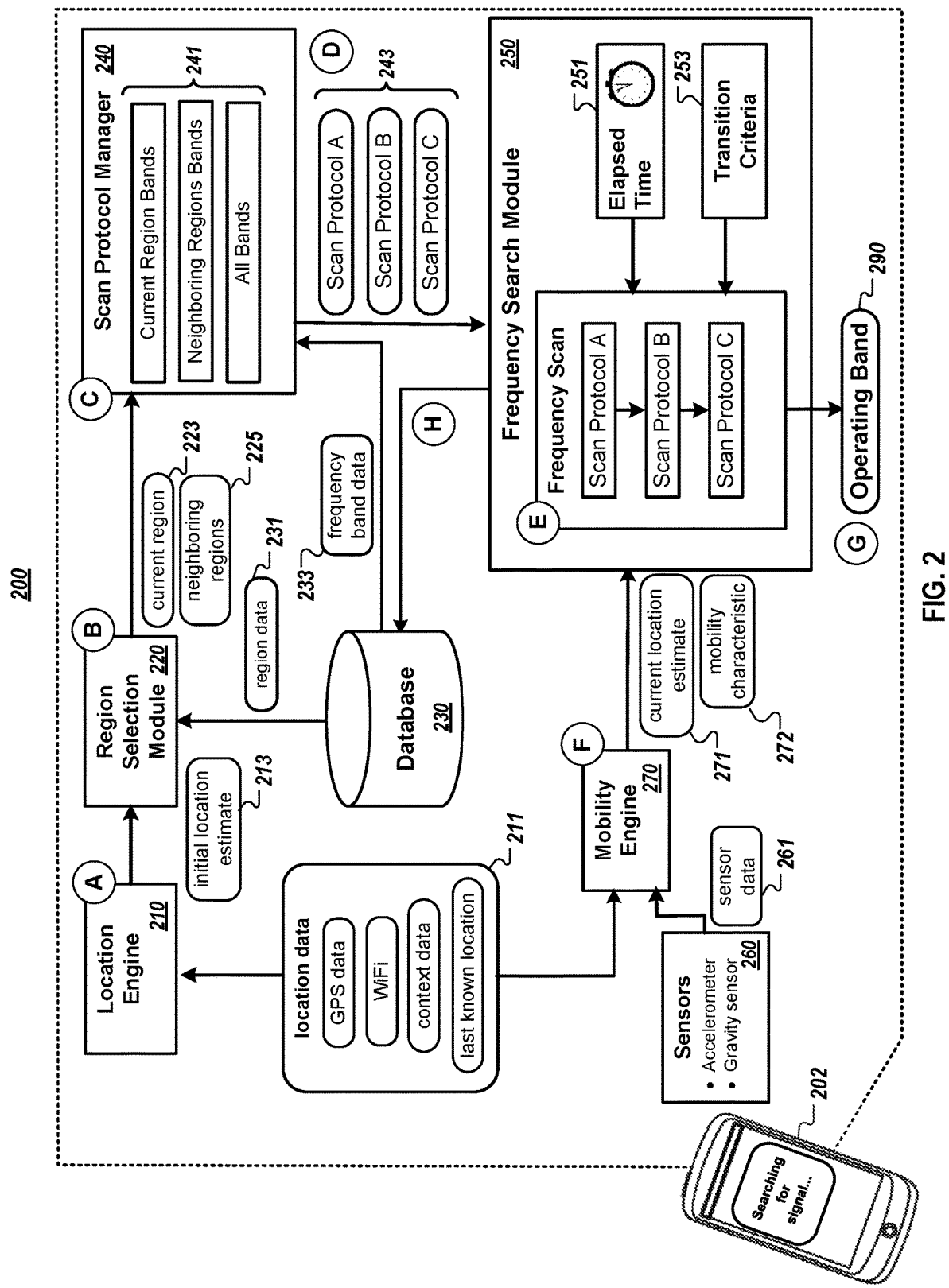
FIG. 2 is a diagram illustrating an example of a system for scanning frequency selection for a wireless device.

FIG. 2 is a diagram illustrating an example of a system 200 for scanning frequency selection for a wireless device. The system 200 includes a mobile wireless device 202 that is configured to search for a communication signal by scanning multiple frequency bands after being powered-on. The mobile device 202 includes a location engine 210 for determining an initial location estimate 213 for the device 202. Based on the initial location estimate 213, a scan protocol manager 240 generates one or more protocols 243, where each protocol identifies sets of frequency bands (e.g., and scanning schedules) to be scanned by the device 202. A frequency search module 250 of the device 202 then scans frequency bands according to one or more of the protocols 243 until an appropriate operating band 290 is identified.

The device 202 also includes one or more sensors 260 that provide data to a mobility engine 270. Based on processing data from the sensors 260 and/or other data, the engine 270 periodically generates a current location estimate 271 and/or an estimated mobility characteristic 272 for the device. Based on the current location estimate 271 and/or the estimated mobility characteristic 272, as well as one or more transition criteria 253, the search module 250 determines whether to transition from using one scan protocol 243 to using another scan protocol 243. FIG. 2 also includes stages (A) through (H), which indicate a data flow.

The mobile device 202 is an electronic device configured to communicate wirelessly with a communications network. For example, the device 202 can be a cellular phone, a smart phone, a tablet computing device, a smart watch, or another electronic device that communicates with a wireless data or telephony network. Typically, the device 202 can include one or more processors (e.g., CPUs, microcontrollers, or other computing devices for processing instructions), as well as various additional hardware components supporting device operation (e.g., one or more memory systems, application-specific integrated circuits (ASICs), transmitters, receivers, antennas, etc.). The device 202 can communicate with the network using one or more analog or digital wireless communications protocols, including, for example, any of various CDMA, GSM, LTE, EDGE, HSPA+, WiMax, or other wireless standards.

Different countries and/or different wireless networks may allot different frequency bands for wireless communication. To support world-wide operations, the mobile device 202 can be designed to operate using any of a large number of frequency bands. To identify an appropriate operating band among the many operating bands that the mobile device 202 supports, the device 202 can be configured to search for an appropriate operating band by scanning multiple frequency bands after being powered-on.

In the example of FIG. 2, the system 200 selects the bands that the device 202 scans based on the initial location estimate 213 for the device 202. The initial location estimate 213 can indicate, for example, a geographic region (e.g., a country, city, metropolitan area, locality, or other region) in which the device 202 is estimated to be located. In some implementations, the initial location estimate 213 may be designated by a mobile country code (MCC) or another representation. In some implementations, the initial location estimate 213 may be a region (e.g., a particular communication cell) associated with a transmitter or receiver of the network (e.g., a base station). In some implementations, the device 202 may update its location estimate subsequent to determining an initial location estimate 213, and the system 200 selects the bands that the device 202 scans based on an updated location estimate (e.g., the current location estimate 271).

In stage (A), the location engine 210 generates an initial location estimate 213 for the recently powered-on mobile device 202. A location estimate 213 may be determined, for example, if the device cannot access GPS or other signals that would indicate an actual location of the device. The location engine 210 can be implemented in any combination of hardware and/or software. For example, the location engine 210 may be a software application configured to execute on an operating system of the device 202, or the location engine 210 may include dedicated hardware components (e.g., one or more ASICs). In some implementations, the location engine 210 can include one or more machine learning modules (e.g., neural networks) that process location data 211 to determine the initial location estimate 213. The location data 211 may lack information about the device's presently known location (e.g., due to unavailability of GPS or WiFi location indicators), but may include information such as a last known location of the device and an indication of an amount of time that has elapsed since the device last measured its actual location. In some implementations, the location engine 210 determines a probability of the device being located at each of one or more possible locations based on the location data 211 (e.g., last known location(s), elapsed time since the last known location was determined, and/or a mobility characteristic of the device).

In some implementations, the engine 210 further uses context data to determine the initial location estimate 213. The context data can include, for instance, user data stored on the mobile device 202, such as data from a user's calendar or schedule, email, or other stored data. For example, the device 202 may access context data that includes a travel itinerary or meeting appointment for a user, or other planned event, based on a time and location of the planned event, determine that the device 202 is estimated to be at the location of the planned event at that time. The device 202 may compare the current time of day when it is powered on to the time of the planned event, and infer that the device 202 is at the location of the planned event if the times match.

In some implementations, the context data can include cell-identifier data received from a signal broadcast by a communication system in a region. For example, the device 202 can store a database of cell identifiers that represent communication cells (e.g., corresponding to different base stations or coverage areas) that are known to be located near the border of a country. The engine 210 can compare the stored cell identifiers to the cell identifiers detected in the broadcasted signals to determine whether the device 202 is near a border of a country or other relevant geographic region where different frequency bands may be employed. In some implementations, the database of cell identifiers is generated based on information provided by network operators. In some implementations, the database of cell identifiers can be generated by the device 202, e.g., by receiving and compiling data from other mobile devices that have already been present in the region and mapped the locations of identified cells. The cell-identifier data can indicate to the location engine 210, in some examples, that the device 202 is located in near a border between two regions (e.g., countries) having networks that operate in different frequency bands. The location engine 210 can use the cell-identifier data to predict that it is in a border area, and thus employ appropriate scanning protocols that combine neighbor MCC bands in the next out of coverage occurrence or occurrence of device power-on.

In some implementations, the context data also includes data from other components of the device 202, such as data related to the status of a battery or other component of the device, a temperature of the device, or other data stored or received by the device. For example, the device may scan more frequently for bands in neighboring or other regions when its remaining battery charge is higher, and may scan less frequently for bands in neighboring or other regions when its battery charge is more depleted, to conserve battery power when there is less remaining charge. Additional forms of context data include indications of historical travel or mobility patterns of the device, indications of wireless networks detected by the device at or near its current location, and image data from images captured by a camera on the device at or near its current location.

The location data 211 used by the location engine 210 can also include a last known location for the device 202 (e.g., the last recorded location of the device 202 before it was powered-off or before location-services on the device 202 were deactivated such as a result from entering airplane mode). In some implementations, the location engine 210 determines the initial location estimate 213 as the last known location if other location data 211 is unavailable, unreliable, or otherwise deemed inappropriate.

Based on the initial location estimate 213, in stage (B), a region selection module 220 of the device 202 identifies one or more geographic regions whose associated frequency bands the device 202 may scan. For example, the region selection module 220 can identify a current region 223, where the current region 223 is a geographic area associated with the initial location estimate 213. The region selection module 220 can also identify one or more neighboring regions 225, where the neighboring regions 225 are geographically adjacent to, or nearby to, the current region 223. The current region 223 and neighboring regions 225 can be countries (e.g., as represented by one or more MCCs), localities, metropolitan areas, cell-coverage areas, or other geographic areas.

In some implementations, to identify the one or more regions, the region selection module 220 accesses region data 231 from a database 230 of the device 202. The region data 231 can include, for example, data mapping the initial location estimate 213 to a current region 223, as well as data indicating the neighboring regions 225 for a particular region 223. In some implementations, the region data 231 indicates one or more MCCs associated with the identified current region 223 and neighboring regions 225.

The region selection module 220 provides the identified current region 223 and the neighboring regions 225 to the scan protocol manager 240. Based on the identified regions, in stage (C), the protocol manager 240 determines one or more frequency band sets 241 for the device 202 to scan when searching for an appropriate operating band. Each frequency band set 241 can specify a list of one or more bands that may be operable in the one or more geographic regions. For example, the sets 241 can include a set of frequency bands associated with the current region 223 (e.g., "Current Region Bands") and a set of frequency bands associated with both the current region 223 and one or more neighboring regions 225 (e.g., "Neighboring Regions Bands"). The sets 241 can also include a set of frequency bands that includes all, or substantially all, of the bands supported by the device 202 (e.g., "All Bands").

In some implementations, the set 241 of Current Region Bands is a subset of the set 241 of Neighboring Regions Bands, while the set 241 of Neighboring Regions Bands is a subset of the set 241 of All Bands. As a result, the set 241 of All Bands may include the greatest number of frequency bands, while the set 241 of Current Region Bands may include the fewest number of frequency bands.

To determine the one or more frequency band sets 241, the protocol manager 240 can access frequency band data 233 stored in the device's database 230. The frequency band data 233 can be data that specifies the frequency bands associated with various regions (e.g., the current region 223, the one or more neighboring regions 225) and that is stored in a static MCC neighbor table of the database 230. In some implementations, the frequency band data 233 may be network-specific, e.g., may indicate only those frequency bands associated with a particular network in a region.

The database 230 can be stored locally on the device 202 (e.g., in a memory system of the device 202) and updated periodically, e.g., by connecting to a wireless network that provides updated data. For example, the database 230 can be updated periodically to indicate new frequency bands that have been added to a particular region.

In stage (D), using the determined frequency band sets 241, the protocol manager 240 generates one or more scan protocols 243. The scan protocols 243 indicate the relative frequency and/or order in which the various frequency band sets 241 are scanned by the device 202 as it searches for a communication signal.

In some implementations, each scan protocol 243 includes multiple scan periods (also referred to as 'timeslots'), where during each scan period, a particular set of bands 241 is scanned. The scan protocol 243 can include one or more scan periods and in some implementations, may include four to ten scan periods. For example, for a scan protocol 243 with nine scan periods, the protocol may indicate that the set 241 of Current Region Bands are scanned on the first, third, fifth, and seventh scan periods, the set 241 of Neighboring Regions Bands are scanned on the second, fourth, sixth, and eight scan periods, and the set 241 of All bands are scanned on the ninth scan period.

The protocol manager 240 can generate the one or more scan protocols 243 by any of various methods. For example, the protocol manager 240 can implement one or more algorithms for determining the frequency and order in which the frequency band sets 241 are scanned for a particular protocol 243. In some implementations, the protocol manager 240 accesses a memory system of the device 202 that stores data indicating the one or more scan protocols 243.

The protocol manager 240 can generate multiple scan protocols 143, where each protocol represents a different trade-off between power consumption and search coverage. In some implementations, the protocol manager 240 generates a sequence of protocols 243, where each successive protocol 243 increases the search coverage provided by the protocol, but at the expense of greater power consumption. For example, the protocol manager 240 can generate a sequence of protocols where each successive protocol increases the relative frequency with which the sets 241 of Neighboring Region Bands and All Bands are scanned.

In the example of FIG. 2, the protocol manager 240 generates a sequence of three scan protocols 243, Scan Protocol A, Scan Protocol B, and Scan Protocol C, where each successive protocol increases the relative frequency with which the sets 241 of Neighboring Region Bands and All Bands are scanned. Generally, the manager 240 can generate a greater or lesser number of protocols 243 (e.g., two, four, or five protocols).

A first scan protocol, Scan Protocol A, generated by the protocol manager 240 primarily scans frequency bands associated with the current region 223, with only occasional scanning of frequency bands associated with the neighboring regions 225 and other bands supported by the device 202. For example, for a Scan Protocol A that includes nine timeslots, the protocol may indicate that the set 241 of Current Region Bands is scanned during six of the nine timeslots, the set 241 of Neighboring Region Bands is scanned during two of the nine timeslots, and the set 241 of All Bands is scanned during only one of the nine timeslots. An example of a Scan Protocol A that scans primarily frequency bands associated with the current region 223 is represented by protocol 310 of FIG. 3.

Because the average number of bands scanned per timeslot is relatively low (i.e., because most timeslots scan the limited set of bands associated with the current region 223), when searching using Scan Protocol A, the device 202 consumes a relatively low amount power from scanning activity. However, because Scan Protocol A only occasionally scans bands associated with the sets 241 of Neighboring Region Bands and All Bands, it provides a relatively limited search coverage and thus may be likely to fail to identify an operable frequency band.

A second scan protocol, Scan Protocol B, generated by the protocol manager 240 scans frequency bands associated with the current region 223 and other frequency bands with relative balance. For example, for a Scan Protocol B that includes nine timeslots, the protocol may indicate that the set 241 of Current Region Bands is scanned during four of the nine timeslots, the set 241 of Neighboring Region Bands is scanned during four of the nine timeslots, and the set 241 of All Bands is scanned during only one of the nine timeslots. An example of a Scan Protocol B that scans frequency bands associated with the current region 223 and other frequency bands with relative balance is represented by protocol 330 of FIG. 3.

Because the average number of frequency bands scanned per timeslot using Protocol B is greater than the average number scanned per timeslot using Protocol A (i.e., because it scans more often the more expansive sets of bands associated with neighboring regions 225), searching using Protocol B consumes more power. However, because more bands are scanned, it provides greater search coverage and thus is less likely to fail to identify an operable frequency band.

A third scan protocol, Scan Protocol C, generated by the scan protocol manager 240, scans primarily frequency bands associated with neighboring regions 225 and other bands supported by the device 202. For example, for a Scan Protocol C that includes four timeslots, the protocol may indicate that the set 241 of Neighboring Region Bands is scanned during three of the four timeslots, while the set 241 of All Bands is scanned during the remaining timeslot. An example of a Scan Protocol C that scans primarily frequency bands associated with neighboring regions 225 and other bands supported by the device 202 is represented by protocol 350 of FIG. 3.

Because Scan Protocol C scans primarily the more expansive sets of bands associated with neighboring regions 225 and other bands supported by the device 202, searching using Scan Protocol C results in the greatest average number of frequency bands scanned per timeslot and thus consumes more power than using either Protocol A or B. However, because Protocol C scans more expansive sets of bands most often, it provides the greatest search coverage and is least likely to fail to identify an operable frequency band.

In stage (E), a frequency search module 250 causes the device 202 to sequentially scan frequency bands according to the scan protocols 243 until an appropriate operating band 290 is identified. For example, the search module 250 may select an initial protocol 243 and repeatedly scan (e.g., cycle through the timeslots of the protocol) according to that protocol 243 until an operating band 290 is detected. In some implementations, if an operating band 290 is not identified by the time a particular transition criteria 253 (e.g., a predetermined time period) is satisfied, the search module 250 transitions from using a current scan protocol 243 to using a next scan protocol 243 (e.g., the search module 250 initiates scanning according to the next scan protocol 243).

For example, after the device 202 powers-on, the search module 250 may initiate searching using Scan Protocol A, which provides the lowest power consumption but most limited search coverage. If the module 250 has not identified an appropriate operating band after scanning using Protocol A for a particular time (e.g., a first transition criterion 253), it may transition to searching using Scan Protocol B, which provides greater search coverage but also requires greater power. Similarly, if the module 250 has not identified an appropriate operating band after scanning using Protocol B for a particular time period (e.g., a second transition criterion 253), it may transition to searching using Scan Protocol C, which provides the greatest search coverage, but consumes the most power. The module 250 may then be configured to continue searching using Protocol C until an appropriate operating band 290 is identified.

To determine when to transition from using one protocol 243 to another, the search module 250 evaluates one or more transition criteria 253. If the transition criteria 253 are satisfied, the module 250 transitions from using a current scan protocol 243 to a next scan protocol 243 (e.g., from Protocol A to Protocol B or from Protocol B to Protocol C). In general, the transition criteria 253 for transitioning between protocols need not be the same (although they may be the same in some implementations). For example, the transition criteria 253 may indicate that the module 250 should transition to using Protocol B after scanning using Protocol A for one hour, while the criteria 253 may indicate that the module 250 should transition to using Protocol C after scanning using Protocol B for two hours.

In the example of FIG. 2, the transition criterion 253 is a predetermined duration indicating how long the search module 250 scans using one scan protocol 243 before transitioning to using another. In some implementations, the transition criteria 253 are stored in a memory system of the device 202 and accessed by the search module 250. In some implementations, the module 250 can determine, calculate, or adjust the transition criteria 253 while scanning frequency bands.

To determine whether the transition criteria 253 is satisfied, in the example of FIG. 2 the module 250 keeps track of an elapsed time 251, which indicates the amount of time that the module 250 has been scanning using a current protocol 243. When the elapsed time 251 exceeds the duration indicated by the transition criteria 253, the module 250 transitions to using a different scan protocol 243 (e.g., transitions from using Scan Protocol A to using Scan Protocol B, etc.).

In some implementations, the module 250 adjusts the transition between scan protocols 243 by adjusting the transition criteria 253 and/or the elapsed time 251 based on an updated current location estimate 271 of the device 202, an estimated mobility characteristic 272 of the device 202, or both a current location estimate 271 and a mobility characteristic 272 of the device 202. The current location estimate 271 and the estimated mobility characteristic 272 can be generated, for instance, by a mobility engine 270 of the device 202. For example, if the module 250 is searching according to Scan Protocol A, which primarily scans frequency bands associated with the current region 223, and the engine 270 determines that the device 202 has likely moved near a border of the current region 223, the module 250 may shorten the duration of the transition criteria 253 such that the module 250 will transition more quickly to using Scan Protocol B, which scans frequency bands of neighboring regions 225 more often.

In stage (F), the mobility engine 270 generates the current location estimate 271 and/or estimated mobility characteristic 272 for the device 202 and provides the location estimate 271 and/or mobility characteristic 272 to the frequency search module 250. The mobility engine 270 can include any combination of hardware and/or software components. For example, the mobility engine 270 can include one or more software applications executed by an operating system of the device 202, and/or one or more ASICs, DSP modules, or other dedicated hardware components. In some implementations, the mobility engine 270 includes one or more machine-learning modules that process data to generate the current location estimate 271 and/or mobility characteristic 272. In some implementations, the mobility engine 270 generates the current location estimate 271 and/or mobility characteristic 272 at periodic intervals (e.g., once every few seconds to tens of seconds or few minutes depending on conditions such as the battery charge level of the device). In some implementations, the mobility engine 270 generates the current location estimate 271 and/or the estimated mobility characteristic 272 while the search module 250 scans frequency bands according to a scan protocol 243.

The mobility engine 270 can generate the current location estimate 271 or mobility characteristic 272 by processing sensor data 261 received from one or more sensors 260 of the device 202. The sensor data 261 can include, for example, data from one or more IMUs, accelerometers, gravity sensors, compasses, gyroscopes, magnetometers, or other sensors of the mobile device 202. The sensor data 211 can thus include acceleration data, velocity data, orientation data, motion data, or other data that indicates a movement of the device 202.

The mobility engine 270 can also generate the current location estimate 271 and/or mobility characteristic 272 using location data 211 for the device 202. Similar to the location data 211 used by the location engine 210 to determine the initial location estimate 213, the location data 211 received by the mobility engine 270 can include information about a last-known location of the device and an estimated amount of time that has lapsed since the last-known location, or a previously known location, was determined. In some implementations, the mobility engine 270 generates the current location estimate 271 and/or mobility characteristic 272 based on a personalized user location model. The user location model can use the user's historical locations and movements, as well as other context data, to predict the current location estimate 271 of the device 202. The user location model can include one or more machine learning models for predicting the current location estimate 271 and/or mobility characteristic 272.

In some implementations, the current location estimate 271 includes a likelihood that the mobile device 202 is located in a particular geographic region. For example, the current location estimate 271 can indicate a likelihood that the mobile device 202 is located in the current region 223, in a border region, or in a neighboring region 225.

In some implementations, the estimated mobility characteristic 272 includes a probable mobility for the device 202. For example, based on the sensor data 261 and/or the location data 211, the mobility engine 270 can determine a mobility characteristic 272 for the device 202 that indicates that the device 202 has been in a high mobility state, a low mobility state, or a stationary state for a recent period of time. Based on the mobility characteristic 272, the search module 250 can adjust the transition criteria 253 to modify the time at which the module 250 transitions to using a different scan protocol 243.

In some implementations, adjusting the transition criteria 253 can include adjusting the elapsed time 251 based on the estimated mobility characteristic 272. For example, if the mobility characteristic 272 indicates that the device 202 has been in a high mobility state for a period of time, the module 250 may determine a normalized elapsed time, which is greater than the actual elapsed time 251. For instance, the module 250 can determine a normalized elapsed time by adding an additional five minutes to the elapsed time 251 for each minute the device 202 is determined to be in a high mobility state, or by multiplying each minute of elapsed time that the device 202 is estimated to have been in a high mobility state by a factor greater than one (e.g., by a factor of five or ten). The module 250 can then use the normalized elapsed time to evaluate whether the transition criteria 253 is satisfied. Using a normalized elapsed time that is greater than the actual elapsed time 251 can have the effect of satisfying the transition criteria 253 more quickly, such that the search module 250 transitions to the next scan protocol 243 after a shorter duration.

The search module 250 can similarly adjust the elapsed time 251 for those minutes that the mobility characteristic 272 indicates that the device 202 has been in a low mobility state, but advance the actual elapsed time 251 by less than it is advanced for the time the device 202 was in a high mobility state. For example, the module 250 can add an additional one minute to the elapsed time 251 for each minute that the device 202 is estimated to be in a low mobility state or multiply the elapsed time 251 that the device has been in a low mobility state by a factor lower than that used when the device 202 is estimated to be in a high mobility state.

In some implementations, if the mobility characteristic 272 indicates that the device 202 was in a stationary state, the module 250 can generate a normalized time that is less than the actual elapsed time 251. For example, the module 250 can determine a normalized elapsed time by subtracting one minute from the actual elapsed time 251 for every minute that the device 202 was estimated to be in a stationary state. The module 250 can then use the normalized elapsed time to evaluate whether the transition criteria 253 is satisfied. Using a normalized elapsed time that is less than the actual elapsed time 251 can have the effect of delaying satisfaction of the transition criteria 253, such that the search module 250 transitions to the next scan protocol 243 after a longer duration.

By adjusting the elapsed time 251 and/or the transition criteria 253 based on the estimated mobility characteristic 272, the module 250 can adjust the frequency bands searched to account for movement of the device 202. In particular, the module 250 can adjust the elapsed time 251 and/or the transition criteria 253 such that it uses a scan protocol that increases the frequency of scanning neighboring bands or other supported bands as the likelihood that the device 202 is no longer in its initial location increases.

In some implementations, the device 202 can adjusting the transition criteria 253 based on the current location estimate 217 of the device 202. For example, if the current location estimate 271 indicates that the device 202 has moved from the interior of a country to a border region of the country, the module 250 can adjust the elapsed time 251 and/or the transition criteria 253 to cause the module 250 to transition more quickly to using a scan protocol 243 that more often scans frequency bands in neighboring regions 225 or other bands supported by the device 202. Alternatively, if the current location estimate 271 indicates that the device 202 remains in an interior region of a country, or has moved further into the interior of a country, the module 250 can adjust the elapsed time 251 and/or the transition criteria 253 to cause the module 250 to continue scanning use a scan protocol 243 that primarily scans the frequency bands of the current region 223 for a longer period of time.

The module 250 can determine whether to adjust the elapsed time 251 and/or the transition criteria 253 based on one or more adjustment conditions. For example, the adjustment conditions may specify that the module 250 should adjust the elapsed time 251 and/or the criteria 253 if the current location estimate 271 indicates that the likelihood that the mobile device 202 is currently located in the current region 223 satisfies (e.g., falls below) a first likelihood threshold, or if the location estimate 271 indicates that the likelihood that the mobile device 202 is currently located in a neighboring region 225 satisfies (e.g., is above) a second likelihood threshold. As another example, the adjustment conditions may specify that the module 250 should make the adjustments if the location estimate 271 indicates that there is a greater likelihood that the mobile device 202 is located in a neighboring region 225 than the current region 233. In some examples, the adjustment conditions may specify that the module 250 should adjust the parameters if the location estimate 271 indicates that the likelihood of the device 202 is located in the current region 223, a neighboring region 225, or a border region changes by a threshold amount.

In some implementations, the adjustment conditions may be based on the estimated mobility characteristic 272 of the mobile device 202. For example, the adjustment conditions may specify that the module 250 should adjust the elapsed time 251 and/or the transition criteria 253 if the mobility characteristic 272 indicates that the device 202 has been in a high mobility state, a low mobility state, or a stationary state for a recent period of time.

In some examples, the conditions may specify that adjustments should be made if the current location estimate 271 and/or the mobility characteristic 272 indicate that the device 202 has moved by more than a predetermined amount over a period of time, has moved with at least an average speed for a period of time, or has moved in a particular direction.

At any time during scanning, if the search module 250 identifies an appropriate operating band 290, it may cease scanning and output the operating band 290, as shown in stage (G). For an example, the device 202 may identify an appropriate operating band 290 by detecting a broadcasted network signal within a scanned frequency band. The device can then cease scanning and provide information identifying the frequency band in which the access signal was detected to other device components to support further mobile device communications.

In some implementations, based on identifying the operating band 290, the search module 250 may update a list of operating frequencies for the current region 223. For example, in stage (H) of FIG. 2, the search module 250 updates a list of operating bands associated with the current location estimate 271 by providing the operating band 290 to the database 230. In some implementations, once communicating with a wireless network, the device 202 may provide one or more bands from the updated list of operating bands to a network database to ensure the network database is up-to-date.

In a typical implementation, the search module 250 progresses through the sequence of scan protocols 243 in a predetermined order (e.g., Protocol A, then Protocol B, then Protocol C) until an appropriate operating band 290 is identified, where the module 250 determines when to transition between protocols 243 based on when the appropriate transition criteria 253 are satisfied. In some implementations, the search module 250 may deviate from the protocol progression based on the initial location estimate. For example, if the initial location estimate 213 indicates that the mobile device 202 is in the interior of a region, the module 250 may initially scan only the set 241 of Current Region Bands 223 for a predetermined time period (e.g., ten minutes), after which it transitions to using the first scan protocol 243 (e.g., Scan Protocol A), then progresses through the protocols 243 as usual. If the initial location estimate 213 indicates that the mobile device is on a border region, the module 250 may initially scan only the set 241 of Neighboring Regions Bands for a predetermined time period (e.g., ten minutes), after which it uses the usual scan protocol progression.

In some implementations, the device 202 includes an airplane mode, which, when turned on, suspends frequency scanning by the search module 250. The device's airplane mode can typically be set by a user, e.g., the user may turn-on airplane mode when traveling by air to be in compliance with various travel regulations. In some implementations, if the device's airplane mode is only activated for a short time (e.g., less than a predetermined time period), the device 202 may resume scanning using the scan settings that were in place when search was suspended (e.g., resume scanning at stage (E) using the scan protocol 243, the elapsed time 251, the transition criteria 253, and the current location estimate 271 last determined before the airplane mode was turned-on). If the device's airplane mode was activated for a longer time (e.g., greater than the predetermined time period), the scan behavior resets to stage (A), similar to when the device 202 is first powered-on, and the device 202 resumes scanning after determining a new initial location estimate 213 and appropriate scan protocols 243.

As described above, the modules, engines, managers, databases, and other components of the mobile device 202 described above can be implemented in any combination of hardware and/or software. For example, the modules, engines, managers, databases, and other components can include one or more software applications configured to execute on an operating system of the device 202 and/or dedicated hardware components, including ASICs, FPGAs, microcontrollers, chipsets, ICs, or other specialized hardware.

While described in a particular order (e.g., stage (A) through stage (H)), the operations performed by the system 200 can be performed in other orders to achieve similar or additional functionality. For example, in some implementations, the region selection module 220 may identify updated current region 223 and neighboring regions 225 (stage (B)) based on the current location estimate 271 (stage (F)), and the scan protocol manager 240 may generate new scan protocols 243 based on the updated regions.

In some implementations, some or all of the stages (A) through (H) are repeated at periodic intervals. For example, the search module 250 may repeat the scanning operations and transition criteria evaluation indicated in stage (E) until an appropriate operating band 290 is identified. Similarly, the mobility engine 270 may periodically update the current location estimate 271 (e.g., stage F)) while the search module 250 conducts frequency scans and evaluates whether to transition to another protocol (e.g., stage (E)).

FIG. 3 is a diagram illustrating examples of scan protocols 310, 330, and 350 used for scanning frequency selection for a wireless device. The scan protocols 310, 330, 350 are examples of Scan Protocols A, B, and C, respectively, that are determined by the protocol manager 240 of the system 200 of FIG. 2. A frequency search module of the mobile device (e.g., the module 250) causes the device to scan frequency bands according to one of the protocols (e.g., the protocol 310), repeating the protocol until an appropriate operating band is identified or a particular transition criteria is satisfied. If the transition criteria is satisfied before an operating band is identified, the module continues to cause the device to scan frequency bands, but initiates scanning according to a different protocol (e.g., protocol 330). In this way, the search module can step through the various search protocols (e.g., scanning according to protocol 310, then according to protocol 330, then according to protocol 350) until an appropriate operating band is identified.

The scan protocol 310 searches primarily frequency bands associated with the current region identified by the device's location engine, and only occasionally scans frequency bands associated with the neighboring regions or other bands supported by the device. The scan protocol 310 includes nine consecutive timeslots, where the device's frequency search module is assigned to scan a particular set of frequency bands during each timeslot. In the scan protocol 310, the search module is assigned to scan the set of Current Region Bands during timeslots one, two, four, five, seven, and eight; the set of Neighboring Region Bands during timeslots three and six; and the set of All Bands supported by the device during timeslot nine (e.g., a 6:2:1 relative frequency for scanning Current Region Bands, Neighboring Region Bands, and the set of All Bands, respectively).

In some implementations, each timeslot is allotted a same amount of time sufficient for completing the longest set of frequency band scans (typically the set of All Bands). For those timeslots that require less than the amount of time allotted (e.g., those assigned to scan the set of Current Region Bands or the set of Neighboring Region Bands), the frequency search module may be idle during part of the timeslot.

The frequency search module can scan according to the scan protocol 310 by starting with the first timeslot (e.g., timeslot one) and consecutively scanning the frequency bands indicated for each timeslot. After scanning the final timeslot (e.g., timeslot nine), the search module can repeat the scan, starting again with the frequency bands indicated by the first timeslot. In some implementations, the device may be configured to pause scanning after the scanning the bands of the final timeslot, then restart scanning the bands of the first timeslot after a predetermined pause interval.

When searching using the scan protocol 310, the device consumes a relatively low power because most timeslots scan the set of Current Region Bands, which includes the fewest number of frequency bands of the three sets. However, because the scan protocol 310 only occasionally scans bands associated with the sets of Neighboring Region Bands and All Bands, it provides a more limited search coverage and thus may result in a failure to identify an operable frequency band.

The scan protocol 330 searches frequency bands associated with the current region and other frequency bands in a relatively balanced manner. Similar to the scan protocol 310, the scan protocol 330 includes nine consecutive timeslots, where the device's frequency search module is assigned to scan a particular set of frequency bands during each timeslot. In the scan protocol 330, the search module is assigned to scan the set of Current Region Bands during timeslots one, three, five, and seven; the set of Neighboring Region Bands during timeslots two, four, six, and eight; and the set of All Bands supported by the device during timeslot nine (e.g., a 4:4:1 relative frequency for scanning Current Region Bands, Neighboring Region Bands, and the set of All Bands, respectively).

Because the protocol 330 scans sets with a greater number of bands more often than the protocol 310, searching using protocol 330 consumes more power than using protocol 310. However, because more bands are scanned more often, it provides greater search coverage and is thus less likely to result in a failure to identify an operable frequency band.

The scan protocol 350 provides even greater search coverage by scanning exclusively the sets of Neighboring Regions Bands and All Bands. The protocol 350 includes four scanning timeslots, where the search module is assigned to scan the set of Neighboring Region Bands during timeslots one, two, and three, while scanning the set of All Bands during timeslot four. Because the protocol 350 scans exclusively the sets of Neighboring Region Bands and All Bands, in an average timeslot, it scans a greater number of frequency bands than are scanned using protocols 310, 330, and so consumes more power. However, because the protocol 350 scans sets with a greater number of bands most often, it provides the greatest search coverage and is least likely to result in a failure to identify an operable frequency band.

FIG. 4 is a flow chart illustrating an example of a method 400 for scanning frequency selection for a wireless device. The method 400 can be performed by a mobile communications device, such as a cell phone, smart phone, tablet, or other device. For example, the method 400 can be performed by the mobile device 202 of FIG. 2. In brief, the method 400 can include scanning, by a mobile device and according to a first scanning protocol, frequencies within (i) one or more first frequency bands that correspond to a first geographic region and (ii) one or more second frequency bands that correspond to a second geographic region (402); determining at least one of an estimated location of the mobile device or an estimated mobility characteristic for the mobile device (404); determining, based on at least one of the estimated location or the estimated mobility characteristic, whether to adjust a scheduled time for the mobile device to initiate scanning according to a second wireless scanning protocol (406); initiating, by the mobile device and at the scheduled time, scanning according to the second wireless scanning protocol (408).

In more detail, the method includes scanning, by a mobile device and according to a first scanning protocol, frequencies within (i) one or more first frequency bands that correspond to a first geographic region and (ii) one or more second frequency bands that correspond to a second geographic region (402). The first and second geographic regions can be, for example, countries, states, municipalities, zones, or other geographic designations. For example, the first geographic region can be a first country and the second geographic region can be a second country. In some implementations, the geographic regions may be identified by one or more mobile country codes (MCCs).

In some implementations, the device determines the first geographic region based on identifying a geographic region that encompasses an initial estimated location of the mobile device. For example, a location engine or other module of the device may determine the initial estimated location of the mobile device. The device can then access a database that stores data correlating locations with one or more geographic regions, and identify the first geographic region as correlated with the initial estimated location. The database can be stored locally on the device (e.g., in a memory system of the device), or stored at a remote location, where the device retrieves data from the database over a network connection.

In some implementations, the location engine determines the initial estimated location of the device based on context data. The context data can include, for example, user data stored on the mobile device, such as data from a user's calendar, email, or other stored data. The context data can include a travel itinerary, an agenda, or an appointment for the user. The context data can also include cell-identifier data received from a signal broadcast by a communication system in a region. In some implementations, the context data also includes data from other components of the device, such as data related to the status of a battery or other component of the device, a temperature of the device, or other data stored or received by the device.

In some implementations, the location engine determines the initial estimated location of the device based on a last known location of the device. For example, when other current measurements of the location are unavailable, such as from GPS or WiFi signals, the engine can determine the initial estimated location of the device as the device's last known location.

In some implementations, the device determines the second geographic region based on identifying one or more geographic regions that neighbor (e.g., are adjacent to, share a border with, etc.) the first geographic region. For example, the device can access a table correlating the MCC of a particular country with the MCCs of neighboring countries to determine one or more neighboring geographic regions. The table can be stored in a local database (e.g., stored in a memory system of the device), or stored at a remote location, where the device retrieves data from the remote location over a network connection.

The one or more first frequency bands corresponding to the first geographic area can be frequency bands in which wireless communication systems in the first geographic region broadcast wireless signals. Similarly, the one or more second frequency bands corresponding to the second geographic area can be frequency bands in which wireless communication systems in the second geographic region broadcast wireless signals. The wireless communication systems in the first and second geographic regions can be, for example, cellular systems providing at least one of voice and/or data services to their respective geographic region.

In some implementations, the one or more first frequency bands that correspond to the first geographic region are different frequency bands than the one or more second frequency bands that correspond to the second geographic region. In some implementations, one or more of the first frequency bands may be the same as one or more of the second frequency bands.

The first wireless scanning protocol specifies relative amounts of time for scanning frequencies within the one or more first frequency bands and for scanning within the one or more second frequency bands. For example, the first wireless scanning protocol can define a scanning cycle that includes a plurality of timeslots. The protocol can further specify, for each timeslot in the scanning cycle, one or more frequency bands in which the mobile device should scan for frequencies during that timeslot. In some implementations, the first wireless canning protocol specifies that the frequencies within the one or more first frequency bands are scheduled to be scanned more often than frequencies within the one or more second frequency bands.

The method 400 also includes determining, by the mobile device, at least one of an estimated location of the mobile device or an estimated mobility characteristic of the mobile device (404). The determined estimated location can, for example, indicate a current estimated location of the device. In some implementations, the estimated location indicates at least one of a likelihood that the mobile device is located in the first geographic region or a likelihood that the mobile device is located in the second geographic region. In some implementations, the estimated mobility characteristic includes an indication of a probable device mobility during a recent time period (e.g., an average speed of the device over a time period; a distance traveled by the device over a time period; a designation as "high mobility," "low mobility," or "stationary"). In some implementations, the estimated location and/or the estimated mobility characteristic indicate that the device has moved a certain amount over a period of time, has moved with an average speed, or has moved in a particular direction.

In some implementations, the device determines at least one of the estimated location or the estimated mobility characteristic while the device is scanning frequencies according to the first wireless scanning protocol. In some implementations, the device determines at least one of the estimated location or the estimated mobility characteristic at periodic intervals.

The mobile device can determine the estimated location and/or estimated mobility characteristic of the device by using sensor data and/or context data, and combining with last known location.

For example, the device can determine its estimated mobility characteristic by monitoring the movements of the device based on data generated by one or more internal sensors of the device. The internal sensor can be, for example, an accelerometer, a compass, a gyroscope, a magnetometer, or another sensor of the device, and the device can determine its estimated location and/or estimated mobility characteristic based on the data provided by the one or more sensors. In some examples, based on the estimated mobility characteristic, the device can then determine an estimated location of the device.

In some implementations, the device determines the estimated location by predicting the location of the mobile device based on user context data stored in a memory system of the mobile device. For example, the device can access user data stored in a memory system of the device that includes a travel itinerary, flight information, a meeting, an appointment, or other calendar information for a user and, based on the data, determine that the device is expected to be in a particular location at the time of the determination.

In some implementations, the device generates the estimated location and/or the estimated mobility characteristic based on a personalized user location model. The user location model can use the user's historical locations and movements, as well as other context data, to predict the location and/or mobility characteristic of the device. The user location model can include one or more machine learning models for predicting the device location and/or mobility characteristic.

Based on at least one of the estimated location or the estimated mobility characteristic of the mobile device, the device can determine to adjust a scheduled time for the mobile device to initiate scanning according to a second wireless scanning protocol (e.g., the scheduled time to transition to, e.g., initiate scanning according to, the second protocol) (406). Similar to the first wireless scanning protocol, the second wireless scanning protocol specifies relative amounts of time for scanning frequencies within the one or more first frequency bands and for scanning within the one or more second frequency bands. The second wireless scanning protocol can define a scanning cycle that includes a plurality of timeslots, where it further specifies, for each timeslot in the scanning cycle, one or more frequency bands in which the mobile device should scan for frequencies during that timeslot.

In some implementations, the first and the second wireless scanning protocols each specify (i) a first subset of timeslots in the scanning cycle for scanning frequencies within the one or more first frequency bands corresponding to the first geographic region, (ii) a second subset of timeslots in the scanning cycle for scanning frequencies within the one or more second frequency bands corresponding to the second geographic region, and (iii) a third subset of timeslots in the scanning cycle to for scanning frequencies within one or more other frequency bands.

In some implementations, the ratio of the first subset of timeslots for scanning frequencies within the one or more first frequency bands relative to the second subset of timeslots for scanning frequencies within the one or more second frequency bands is less in the second wireless scanning protocol than in the first wireless scanning protocol. For example, the first wireless scanning protocol may specify a first subset of six timeslots for scanning frequencies within the one or more first frequency bands and a second subset of two timeslots for scanning frequencies within the one or more second frequency bands, for a ratio of first subset timeslots to second subset time slots of three (i.e., 6:2). The second wireless scanning protocol may specify a first subset of four timeslots for scanning frequencies within the one or more first frequency bands and a second subset of four timeslots for scanning frequencies within the one or more second frequency bands, for a ratio of first subset timeslots to second subset time slots of one (i.e., 4:4).

In some implementations, the device determines whether to adjust the scheduled time for initiating scanning according to the second wireless scanning protocol by determining that at least one of the estimated location or the estimated mobility characteristic satisfies one or more adjustment conditions. For example, the device may adjust the scheduled time if the estimated location indicates that the likelihood that the device is in the first region, in the second region, or in a border region satisfies a predetermined likelihood threshold, or if the estimated location indicates that the likelihood that the device is in the first region, in the second region, or in a border region changes by a predetermined threshold amount.

In some implementations, the device determines whether to adjust the scheduled time for initiating scanning according to the second wireless scanning protocol based on the mobility characteristic of the device. For example, the device can determine to adjust the schedule time for transitioning to the second protocol if the estimated mobility characteristic satisfies an adjustment condition. The adjustment condition can require, for instance, that the estimated mobility characteristic indicate that the device has been in a high mobility state, a low mobility state, or a stationary state for an amount of time; that the device has moved more than a predetermined distance over a period of time; the device has moved with at least an average speed for a period of time; or that the device has moved in a particular direction for an amount of time.

In some cases, the device may adjust the scheduled time for transitioning to the second protocol by delaying the scheduled time for transitioning. For example, if the estimated location indicates that the mobile device is more likely located in the first geographic region than in the second geographic region, or that the device has been stationary for a period of time, the device may delay the scheduled time for transitioning (e.g., by lengthening a predetermined transition duration). In some cases, the device may adjust the scheduled time for transitioning to the second protocol by moving forward the scheduled time. For example, if the estimated location indicates that the mobile device is more likely located in the second geographic region than in the first geographic region, is likely located in a border region between the first and second geographic regions, or has been moving for a period of time (e.g., has a mobility characteristic that indicates the device has been in a high or low mobility state for a period of time), the device may move forward the scheduled time for transitioning (e.g., by shortening a predetermined transition duration).

In some implementations, the device adjusts the scheduled time for the mobile device to initiate scanning according to a second wireless protocol by adjusting an elapsed time maintained by the device. For example, based on the estimated mobility characteristic, the device can generate a normalized elapsed time. The normalized elapsed time can be longer than the actual elapsed time (e.g., if the estimated mobility characteristic indicates that the device has been in a high or low mobility state for a period of time) or shorter than the actual elapsed time (e.g., if the estimated mobility characteristic indicates that the device has been stationary for a period of time). If the device then determines that the normalized elapsed time satisfies a transition criterion (e.g., the normalized elapsed time is at least a predetermined transition duration), it can adjust the scheduled time for transitioning to the second wireless protocol.

The method 400 also includes initiating, by the mobile device and at the scheduled time, scanning according to the second wireless scanning protocol (408).

If an appropriate operating band is present within one or more frequency bands, the device can further identify a broadcasted network signal within a scanned frequency band and, in response to identifying the broadcasted network access signal, cease to scan frequencies. The device can then provide information identifying the frequency band in which the access signal was detected to other system components to support further mobile device communications.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method for identifying an operating frequency band for wireless communication, comprising:
   scanning, by a mobile device and according to a first wireless scanning algorithm, frequencies within a first subset of frequency bands of a wireless communication protocol that correspond to a first geographic region and a second subset of frequency bands of the wireless communication protocol that correspond to a second geographic region, the first wireless scanning algorithm specifying a first ratio of respective times for scanning for frequencies within the first subset of frequency bands and the second subset of frequency bands;
   determining a mobility characteristic of the mobile device;
   scheduling, based on the mobility characteristic of the mobile device, a transition from scanning according to the first wireless scanning algorithm to scanning according to a second wireless scanning algorithm;
   transitioning, by the mobile device and based on the scheduled transition, from scanning according to the first wireless scanning algorithm to scanning according to the second wireless scanning algorithm; and
   scanning, by the mobile device and according to the second wireless scanning algorithm, frequencies within the first subset of frequency bands of the wireless communication protocol that correspond to the first geographic region and the second subset of frequency bands of the wireless communication protocol that correspond to the second geographic region, the second wireless scanning algorithm specifying a second ratio of respective times for scanning for frequencies within the first subset of frequency bands and the second subset of frequency bands that is different from the first ratio of respective times of the first wireless scanning algorithm.

2. The method of claim 1, further comprising:
   identifying the first geographic region based on an initial estimated location of the mobile device being within the first geographic region, wherein wireless communication systems in the first geographic region broadcast wireless signals within the first subset of frequency bands of the wireless communication protocol; and
   identifying the second geographic region based on the second geographic region neighboring the first geographic region, wherein wireless communication systems in the second geographic region broadcast wireless signals within the second subset of frequency bands of the wireless communication protocol.

3. The method of claim 2, wherein the respective wireless communication systems in the first geographic region and the second geographic region are cellular systems that provide voice services or data services through a wireless network implemented in accordance with the wireless communication protocol.

4. The method of claim 1, wherein the first subset of frequency bands that correspond to the first geographic region include at least some frequency bands that are different frequency bands of the second subset of frequency bands that correspond to the second geographic region.

5. The method of claim 1, wherein:
   the first geographic region corresponds to a first country or a first mobile country code (MCC); and
   the second geographic region corresponds to a second country or a second MCC.

6. The method of claim 2, wherein identifying the first geographic region based on the initial estimated location of the mobile device being within the first geographic region comprises:
   determining the initial estimated location of the mobile device;
   accessing a database that stores data correlating geographic regions with locations; and
   using the database to determine that the first geographic region is correlated with the initial estimated location of the mobile device.

7. The method of claim 1, wherein:
   the first wireless scanning algorithm defines a first plurality of timeslots and specifies which of the first subset of frequency bands or the second subset of frequency bands to scan during each of the first plurality of timeslots; and
   the second wireless scanning algorithm defines a second plurality of timeslots and specifies which of the first subset of frequency bands or the second subset of frequency bands to scan during each of the second plurality of time slots.

8. The method of claim 1, further comprising determining an estimated location of the mobile device based on user context data stored in a memory of the mobile device, and wherein the mobile device schedules the transition from scanning according to the first wireless scanning algorithm to scanning according to the second wireless scanning algorithm based on the mobility characteristic of the mobile device and the estimated location of the mobile device.

9. The method of claim 1, wherein scheduling the transition from scanning according to the first wireless scanning algorithm to scanning according to the second wireless scanning algorithm comprises:
   adjusting, based on the mobility characteristic of the mobile device, an initially scheduled transition to generate an adjusted transition schedule.

10. The method of claim 9, wherein adjusting the initially scheduled transition to generate the adjusted transition schedule comprises:
    delaying the initially scheduled transition based on determining that the mobile device is more likely located in the first geographic region than in the second geographic region; or advancing the initially scheduled transition based on determining that the mobile device is more likely located in the second geographic region than in the first geographic region.

11. The method of claim 1, further comprising:
identifying, by the mobile device, a network access signal that is broadcast by a wireless network provider within one of the frequency bands scanned by the mobile device according to the first wireless scanning algorithm or the second wireless scanning algorithm; and
ceasing, by the mobile device, to scan in response to identifying the network access signal within the frequency band scanned by the mobile device.

12. The method of claim 1, further comprising:
scanning, by the mobile device and according to the first wireless scanning algorithm, frequencies within the first subset of frequency bands of the wireless communication protocol that correspond to the first geographic region, the second subset of frequency bands of the wireless communication protocol that correspond to the second geographic region, and a set of all frequency bands of the wireless communication protocol, the first wireless scanning algorithm specifying the first ratio of respective times for scanning for frequencies within the first subset of frequency bands, the second subset of frequency bands, and the set of all of frequency bands of the wireless communication protocol; and
scanning, by the mobile device and according to the second wireless scanning algorithm, frequencies within the first subset of frequency bands of the wireless communication protocol that correspond to the first geographic region, the second subset of frequency bands of the wireless communication protocol that correspond to the second geographic region, and the set of all frequency bands of the wireless communication protocol, the second wireless scanning algorithm specifying the second ratio of respective times for scanning for frequencies within the first subset of frequency bands, the second subset of frequency bands, and the set of all frequency bands of the wireless communication protocol that is different from the first ratio of respective times of the first wireless scanning algorithm.

13. The method of claim 1, further comprising:
scanning, by the mobile device and according to a third wireless scanning algorithm, frequencies within the second subset of frequency bands of the wireless communication protocol that correspond to the second geographic region and a set of all frequency bands of the wireless communication protocol, the third wireless scanning algorithm specifying a third ratio of respective times for scanning for frequencies within the second subset of frequency bands and the set of all of frequency bands of the wireless communication protocol, the third ratio of respective times not including a specified time for scanning the first subset of frequency bands of the wireless communication protocol that correspond to the first geographic region.

14. The method of claim 1, wherein:
scanning, by the mobile device, the frequencies within the first subset of frequency bands of the wireless communication protocol that correspond to the first geographic region and the second subset of frequency bands of the wireless communication protocol that correspond to the second geographic region according to the second wireless scanning algorithm consumes a first amount of power; and scanning, by the mobile device, the frequencies within the first subset of frequency bands of the wireless communication protocol that correspond to the first geographic region and the second subset of frequency bands of the wireless communication protocol that correspond to the second geographic region according to the first wireless scanning algorithm consumes a second amount of power that is less than the first amount of power such that scanning according to the first wireless scanning algorithm reduces power consumption of the mobile device relative to scanning according to the second wireless scanning algorithm.

15. One or more non-transitory computer-readable media having instructions stored thereon that, responsive to execution by one or more processors, cause performance of operations comprising:
scanning, by a mobile device and according to a first wireless scanning algorithm, frequencies within a first subset of frequency bands of a wireless communication protocol that correspond to a first geographic region and a second subset of frequency bands of the wireless communication protocol that correspond to a second geographic region, the first wireless scanning algorithm specifying a first ratio of respective times for scanning for frequencies within the first subset of frequency bands and the second subset of frequency bands;
determining a mobility characteristic of the mobile device;
scheduling, based on the mobility characteristic of the mobile device, a transition from scanning according to the first wireless scanning algorithm to scanning according to a second wireless scanning algorithm;
transitioning, by the mobile device and based on the scheduled transition, from scanning according to the first wireless scanning algorithm to scanning according to the second wireless scanning algorithm; and
scanning, by the mobile device and according to the second wireless scanning algorithm, frequencies within the first subset of frequency bands of the wireless communication protocol that correspond to the first geographic region and the second subset of frequency bands of the wireless communication protocol that correspond to the second geographic region, the second wireless scanning algorithm specifying a second ratio of respective times for scanning for frequencies within the first subset of frequency bands and the second subset of frequency bands that is different from the first ratio of respective times of the first wireless scanning algorithm.

16. The one or more non-transitory computer-readable media of claim 15, wherein the operation of determining the mobility characteristic of the mobile device comprises monitoring movements of the mobile device based on data generated by an internal sensor of the device.

17. The one or more non-transitory computer-readable media of claim 15, wherein the operations further comprises:
determining an estimated location of the mobile device based on user context data stored in a memory system of the mobile device; and
wherein the operation of scheduling the transition from scanning according to the first wireless scanning algorithm to scanning according to the second wireless scanning algorithm is based on the mobility characteristic of the mobile device and the estimated location of the mobile device.

18. A mobile device, comprising:
a receiver configured to communicate in accordance with a wireless communication protocol;
one or more processors; and
one or more computer-readable media having instructions stored thereon that, responsive to execution by the one or more processors, cause the one or more processors to perform operations comprising:
scanning, by the mobile device and according to a first wireless scanning algorithm, frequencies within a first subset of frequency bands of the wireless communication protocol that correspond to a first geographic region and a second subset of frequency bands of the wireless communication protocol that correspond to a second geographic region, the first wireless scanning algorithm specifying a first ratio of respective times for scanning for frequencies within the first subset of frequency bands and the second subset of frequency bands;
determining a mobility characteristic of the mobile device;
scheduling, based on the mobility characteristic of the mobile device, a transition from scanning according to the first wireless scanning algorithm to scanning according to a second wireless scanning algorithm
transitioning by the mobile device and based on the scheduled transition, from scanning according to the first wireless scanning algorithm to scanning according to the second wireless scanning algorithm; and
scanning, by the mobile device and according to the second wireless scanning algorithm, frequencies within the first subset of frequency bands of the wireless communication protocol that correspond to the first geographic region and the second subset of frequency bands of the wireless communication protocol that correspond to the second geographic region, the second wireless scanning algorithm specifying a second ratio of respective times for scanning for frequencies within the first subset of frequency bands and the second subset of frequency bands that is different from the first ratio of respective times of the first wireless scanning algorithm.

19. The method of claim 12, further comprising:
scanning, by the mobile device and according to a third wireless scanning algorithm, frequencies within the second subset of frequency bands of the wireless communication protocol that correspond to the second geographic region and the set of all frequency bands of the wireless communication protocol, the third wireless scanning algorithm specifying a third ratio of respective times for scanning for frequencies within the second subset of frequency bands and the set of all frequency bands of the wireless communication protocol that is different from the first ratio of respective times and the second ratio of respective times, and the third ratio of respective times not including a specified time for scanning the first subset of frequency bands of the wireless communication protocol that correspond to the first geographic region.

20. The method of claim 12, wherein:
the first ratio of respective times of the first wireless scanning algorithm includes a first respective time for scanning frequencies within the first subset of frequency bands that is approximately three times a second respective time for scanning frequencies within the second subset of frequency bands; and
the second ratio of respective times of the second wireless scanning algorithm includes a third respective time for scanning frequencies within the first subset of frequency bands that is approximately equal to a fourth respective time for scanning frequencies within the second subset of frequency bands.

* * * * *

UNITED STATES PATENT AND TRADEMARK OFFICE
CERTIFICATE OF CORRECTION

PATENT NO. : 10,728,875 B2  
APPLICATION NO. : 16/149974  
DATED : July 28, 2020  
INVENTOR(S) : Shivank Nayak et al.

Page 1 of 1

It is certified that error appears in the above-identified patent and that said Letters Patent is hereby corrected as shown below:

In the Specification

Column 27, Lines 43 and 44, after "scanning" before "transitioning" delete "algorithm" insert --algorithm;-- and insert a paragraph break Column 31, Lines 25 and 26, after "scanning" before "transitioning" delete "algorithm" insert --algorithm;-- and insert a paragraph break Signed and Sealed this  
Tenth Day of November, 2020

Andrei Iancu  
*Director of the United States Patent and Trademark Office*